(No Model.)
E. W. JENKINS.
FISH TRAP.
No. 379,701. Patented Mar. 20, 1888.
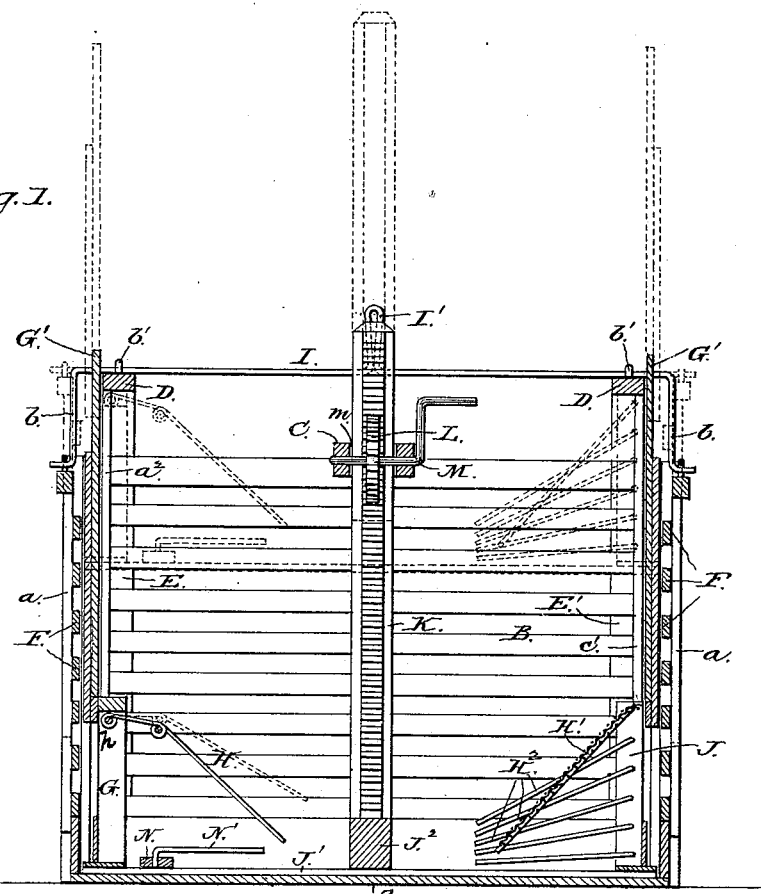
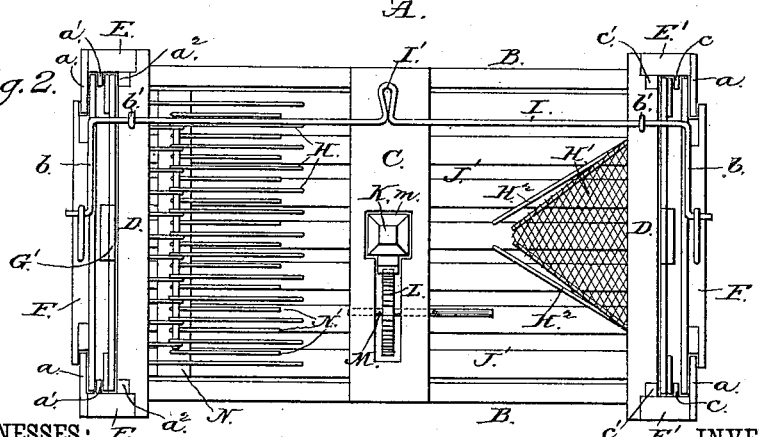
WITNESSES:
John A. Ellis
C. Sedgwick
INVENTOR:
E. W. Jenkins
BY Munn & Co.
ATTORNEYS.

UNITED STATES PATENT OFFICE.

ELIJAH W. JENKINS, OF MILFORD, MISSOURI.

FISH-TRAP.

SPECIFICATION forming part of Letters Patent No. 379,701, dated March 20, 1888.

Application filed May 24, 1887. Serial No. 239,228. (No model.)

*To all whom it may concern:*

Be it known that I, ELIJAH W. JENKINS, of Milford, in the county of Barton and State of Missouri, have invented a new and Improved Fish-Trap, of which the following is a full, clear, and exact description.

Reference is to be had to the accompanying drawings, forming a part of this specification, in which similar letters of reference indicate corresponding parts in both the figures.

Figure 1 is a sectional elevation of my new and improved fish-trap, and Fig. 2 a plan view thereof.

The invention will first be described in connection with the drawings, and then pointed out in the claims.

The frame of the fish-trap is composed of the bottom A, slatted side walls, B B, the central cross-piece, C, and the end elevated cross-pieces, D D. In the corner-posts E E' are held by the cleats $a$ $a$ the slatted and vertically-movable end walls, F F. These are connected to the arms $b$ $b$ of the rod I, which is held by the staples or keepers $b'$ $b'$. The center of the rod I is bent to form a lever, I', so that by pressing downward upon the lever the arms $b$ may be elevated for elevating the end walls, F F, to permit the entrance of the fish to the trap through the frame G. This frame is held by the cleats $a'$ $a^2$ on the corner-posts, and is provided upon the inside with the wires H, hinged at $h$, so that fish may swim into the trap under these wires, but as soon as the fish pass the wires will drop down and prevent their escape. The frame G is provided with the upwardly-projecting arm G', by which the said frame may be raised and lowered. The fish are prevented from swimming through the trap by the wire-netting H', and the converging wires H², secured in the frame J, held by the cleats $c$ $c'$, secured to the corner-posts E E'.

J' represents a slatted false bottom fitted in the trap, and to the central cross-piece, J', thereof is secured the vertical rack-bar K. This passes up through a mortise, $m$, in the upper cross-piece, C, and in said mortise is placed the gear-wheel L, secured upon the crank-shaft M, so that by turning this crank-shaft the false bottom J' and also the two frames G J may be raised to the position shown in dotted lines in Fig. 1 for taking out the fish.

At the time the false bottom and the said frames are thus elevated the slatted end walls, F, are to be lowered to prevent fish from passing through the trap; but when the said false bottom and frames are lowered to the bottom of the trap, as shown in full lines in Fig. 1, the said end wall will be raised by pressing down upon the lever I', thus lifting the end walls, as shown in dotted lines in Fig. 1.

Immediately under the hinged wires H the false bottom J' is provided with the cleat N, which is provided with the series of wires N', to prevent fish from swimming out of the trap under the ends of the wires H, as will be understood from Fig. 2.

In this application I make no claim, broadly, to the combination, with the casing provided with slatted sides and a solid bottom, of vertically-movable end-gates, a false bottom within said casing, and a rack and pinion and means for operating the latter, said rack being connected with said false bottom and engaged by said pinion, all as disclosed in my application filed November 15, 1886, and of which the serial number is 218,915.

Having thus described my invention, what I claim as new, and desire to secure by Letters Patent, is—

1. The combination, in a fish-trap, with the main frame, of the false bottom fitted within said frame, and carrying supplemental frames provided with the pivoted entrapping-wires hung in alignment with the fish-entrances, the rack-bar centrally disposed within the main frame and connected to the false bottom, and the shaft supported in the upper part of the main frame and provided with a pinion engaging with the rack-bar, substantially as and for the purpose set forth.

2. In a fish-trap, the combination, with the main frame and the sliding end walls, and means for raising and lowering the said end walls, of the false bottom fitted within the said main frame, and carrying supplemental frames provided with the pivoted entrapping-wires hung upon the inside of the trap in alignment with the fish-entrances, and means for raising and lowering said false bottom, substantially as and for the purpose set forth.

3. In a fish-trap, the combination, with the main frame, of the false bottom having the supplemental frames provided with the pivoted entrapping-wires or netting hung upon the inside of the trap in alignment with the fish-entrances, substantially as and for the purpose specified.

4. In a fish-trap, the combination, with the main frame, of the false bottom carrying supplemental frames provided at the fish-entrances, upon the inside of the trap, with a series of horizontal wires, and a series of hinged dropping wires arranged above the aforesaid wires and in alignment with the said fish-entrances, substantially as and for the purpose set forth.

ELIJAH W. JENKINS.

Witnesses:
WM. TERRY,
JOHN W. KEITHLY.